(12) United States Patent
Liu

(10) Patent No.: US 10,423,664 B2
(45) Date of Patent: *Sep. 24, 2019

(54) METHOD AND SYSTEM FOR PROVIDING RECOMMENDED TERMS

(71) Applicant: Alibaba Group Holding Limited, George Town (KY)

(72) Inventor: Yizhe Liu, Hangzhou (CN)

(73) Assignee: Alibaba Group Holding Limited (KY)

( * ) Notice: Subject to any disclaimer, the term of this patent is extended or adjusted under 35 U.S.C. 154(b) by 0 days.

This patent is subject to a terminal disclaimer.

(21) Appl. No.: 15/436,633

(22) Filed: Feb. 17, 2017

(65) Prior Publication Data

US 2017/0242933 A1    Aug. 24, 2017

Related U.S. Application Data

(63) Continuation of application No. 14/339,715, filed on Jul. 24, 2014, now Pat. No. 9,619,564.

(30) Foreign Application Priority Data

Jul. 29, 2013    (CN) .......................... 2013 1 0322455

(51) Int. Cl.
*G06F 16/30*    (2019.01)
*G06F 16/9032*    (2019.01)
(Continued)

(52) U.S. Cl.
CPC .... *G06F 16/90328* (2019.01); *G06F 16/3322* (2019.01); *G06F 16/9038* (2019.01);
(Continued)

(58) Field of Classification Search
CPC ........... G06F 17/30864; G06F 17/2735; G06F 16/90328; G06F 16/951; G06F 16/9535;
(Continued)

(56) References Cited

U.S. PATENT DOCUMENTS 7,912,915 B1    3/2011    Brin
7,970,664 B2 *   6/2011    Linden ................... G06Q 30/02
                                                                   705/26.1
(Continued)

FOREIGN PATENT DOCUMENTS

CN    103164424    5/2017
KR    20080023634   3/2008
KR    20130058856   6/2013

OTHER PUBLICATIONS

Jin et al., CT-Rank: A Time-aware Ranking Algorithm for Web Search, Journal of Convergence Information Technology, Aug. 2010, pp. 99-111, vol. 5, No. 6.

(Continued)

*Primary Examiner* — Tarek Chbouki
(74) *Attorney, Agent, or Firm* — Van Pelt, Yi & James LLP

(57) ABSTRACT

Embodiments of the present application relate to a method, a system, and a computer program product for providing recommended terms. A method for providing recommended terms is provided. The method includes determining a search query input by a user and an input time point when the search query was input, determining whether the input time point falls within a time range preset within a current time period, if the input time point falls within the time range preset within the current time period, determining whether the search query is present in a word bank preset for the time range, and if the search query is present in the word bank, providing the user with a special event recommended term preset for the time range.

13 Claims, 7 Drawing Sheets

(51) Int. Cl.
*G06Q 30/06* (2012.01)
*G06F 16/951* (2019.01)
*G06F 16/9038* (2019.01)
*G06F 16/9535* (2019.01)
*G06F 17/27* (2006.01)
*G06F 16/332* (2019.01)

(52) U.S. Cl.
CPC ........ *G06F 16/951* (2019.01); *G06F 16/9535* (2019.01); *G06F 17/277* (2013.01); *G06F 17/2735* (2013.01); *G06Q 30/0607* (2013.01); *G06Q 30/0625* (2013.01)

(58) Field of Classification Search
CPC .............. G06F 16/3322; G06F 17/277; G06F 30/0607; G06F 30/0625
See application file for complete search history.

(56) References Cited

U.S. PATENT DOCUMENTS

| | | | |
|---|---|---|---|
| 9,589,032 B1* | 3/2017 | Brinck | G06F 17/30554 |
| 2002/0154124 A1 | 10/2002 | Han | |
| 2004/0002963 A1 | 1/2004 | Cynkin et al. | |
| 2006/0195442 A1* | 8/2006 | Cone | G06F 17/30867 |
| 2007/0038615 A1 | 2/2007 | Vadon | |
| 2007/0050339 A1* | 3/2007 | Kasperski | G06F 17/30967 |
| 2007/0244866 A1* | 10/2007 | Mishkanian | G06F 17/3064 |
| 2008/0114564 A1 | 5/2008 | Ihara | |
| 2008/0243821 A1 | 10/2008 | Delli Santi | |
| 2008/0255932 A1 | 10/2008 | Timmons | |
| 2008/0255935 A1 | 10/2008 | Madhavan et al. | |
| 2010/0131484 A1 | 5/2010 | Gosse | |
| 2011/0099201 A1* | 4/2011 | Shen | G06F 17/30643 707/771 |
| 2011/0131633 A1* | 6/2011 | MacAskill | G06F 21/6209 726/4 |
| 2011/0191364 A1* | 8/2011 | LeBeau | G06F 17/30672 707/767 |
| 2011/0225015 A1 | 9/2011 | Spivack | |
| 2011/0289422 A1* | 11/2011 | Spivack | G06Q 10/109 715/739 |
| 2012/0209907 A1* | 8/2012 | Andrews | G06F 17/30867 709/204 |
| 2012/0221543 A1 | 8/2012 | Timm | |
| 2012/0296743 A1 | 11/2012 | Velipasaoglu | |
| 2013/0041735 A1* | 2/2013 | Johnson | G06Q 30/0207 705/14.23 |
| 2013/0275453 A1* | 10/2013 | Vyas | G06F 17/3097 707/767 |
| 2013/0290820 A1* | 10/2013 | Dhanani | G06Q 50/01 715/205 |
| 2014/0282132 A1* | 9/2014 | Daly, IV | G06F 3/04817 715/763 |
| 2015/0169722 A1* | 6/2015 | Schueppert | G06F 17/30551 707/738 |
| 2015/0235280 A1* | 8/2015 | Vilcauskas, Jr. | G06Q 30/0277 705/14.73 |

OTHER PUBLICATIONS

Kulkarni et al., Understanding Temporal Query Dynamics, Proceedings of the Fourth ACM International Conference on Web Search and Data Mining, Feb. 9-12, 2011, pp. 167-176, ACM.

Metzler et al., Improving Search Relevance for Implicitly Temporal Queries, Proceedings of the 32nd International ACM SIGIR Conference on Research and Development in Information Retrieval, Jul. 19-23, 2009, pp. 700-701, ACM.

English Translation of Zhenqi et al. "Predictability analysis of trunk line traffic in large LANs" J. Huazhong Univ. of Sci. and Tech. (Nature Science Edition), vol. 31 Sup., Oct. 2003.

* cited by examiner

300

METHOD AND SYSTEM FOR PROVIDING RECOMMENDED TERMS

CROSS REFERENCE TO OTHER APPLICATIONS

This application is a continuation of co-pending U.S. patent application Ser. No. 14/339,715, entitled METHOD AND SYSTEM FOR PROVIDING RECOMMENDED TERMS filed Jul. 24, 2014 which is incorporated herein by reference for all purposes, which claims priority to People's Republic of China Patent Application No. 201310322455.0 entitled A METHOD AND DEVICE FOR PROVIDING RECOMMENDED TERMS, filed Jul. 29, 2013 which is incorporated herein by reference for all purposes.

FIELD OF THE INVENTION

The present application relates to a method and system for providing a recommended term.

BACKGROUND OF THE INVENTION

Currently, major holidays often represent business opportunities for e-commerce websites. Typically, website owners set up a special holiday page on the day of a major holiday or during a few days preceding the major holiday.

For example, during the Christmas holiday, e-commerce website owners typically display Christmas-related product information, such as Christmas trees, peace apples, and reindeer antlers, on a separate page. This separate page is a special holiday page.

Conventionally, a method for guiding users in jumping from a website's home page to a special event page is by adding a link, such as a graphic link or a text link, to the home page used to jump to the special event page. As used herein, jumping refers to being redirected to another web page.

However, with the above method, links that redirect users to the special event page are to be added to the home page when the special event page is activated online, and the special event page link is to be removed from the home page when the special event page is taken offline. In other words, the conventional method for guiding users from a home page of a website to a special event page involves a manual adjustment to the structure of the home page. The above method involves a cumbersome process, is relatively inefficient, and increases the maintenance cost of the website. In addition, the user will often conduct more searches or jumps to find the appropriate special event page or information displayed on the special event page. These additional searches or jumps add to the network load. The additional network load is even more noticeable at holiday times when large increases in visiting users occur in short periods of time. If the visiting users also are to conduct multiple searches or jumps, resource utilization on a website server increases enormously and may even cause the website server to crash.

BRIEF DESCRIPTION OF THE DRAWINGS

Various embodiments of the invention are disclosed in the following detailed description and the accompanying drawings.

DETAILED DESCRIPTION

Figure 1:
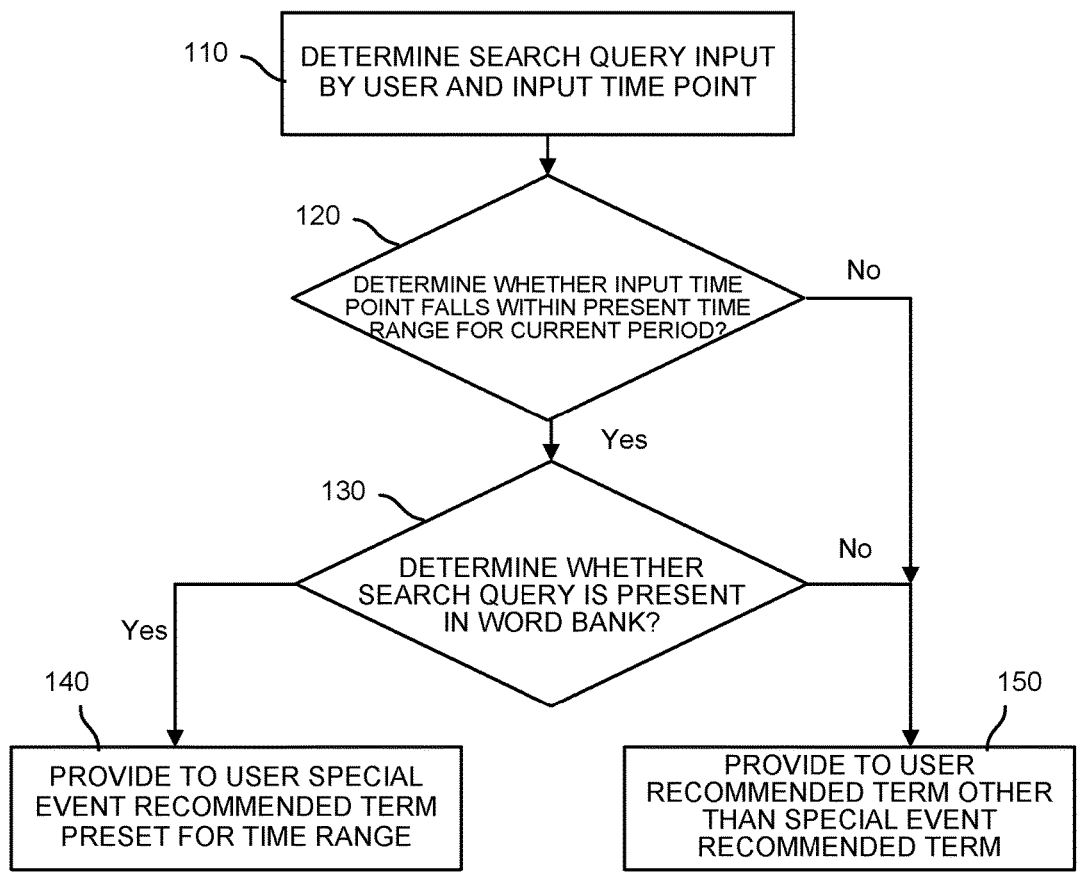
FIG. 1 is a flow diagram illustrating an embodiment of a process for providing a recommended term.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Embodiments of the method and system for providing a recommended term make use of a first entrance whereby users jump from a website homepage to another page, i.e., a search box that provides users with special event recommended terms for special event pages. When a user clicks or activates a special event recommended term, the user is redirected to a corresponding special event page. Thus, the special event recommended term provided to the user is used to guide the user to the special event page without having a link on the homepage to guide the user. In other words, manually adjusting the structure of the homepage is not required. Therefore, in this approach, users can be guided to special event pages, which reduce website maintenance costs and conserve human resources. This approach also effectively reduces the number of searches and jumps users perform when the users are looking up special event pages or information displayed in the special event pages. Thus, this approach reduces server resource utilization and a likelihood of a server crash.

FIG. 1 is a flow diagram illustrating an embodiment of a process for providing a recommended term. In some embodiments, the process 100 is implemented by a server 420 of FIG. 4 and comprises:

In 110, the server determines a search query input by a user and an input time point when the search query was input.

In some embodiments, after the website server provides a user with the homepage of the website, the user typically enters keywords, i.e., a search query, for information in the homepage search box. The server then confirms the search query input by the user and determines a time when the user inputs the search query as the input time point.

For example, the user enters the search query "Christmas tree" into the search box of the homepage. The server determines the search query "Christmas tree" input by the user and the input time point when "Christmas tree" was input.

In 120, the server determines whether the input time point falls within a present time range for the current period. In this example, the current period refers to the time when the process is in effect, so if the current period is 2012-2013, then the process is not in effect in 2014, and the present time range refers to the present special event period, such as, for example, the time period corresponding to Christmas. In the event that the input time point falls within the present time range for the current period, control is passed to 130. In the event that the input time point does not fall within the present time range for the current period, control is passed to 150.

In some embodiments, time ranges corresponding to special event pages provided within each time period are preset in the server. For example, the above time range is one year. In another example, for the Christmas holiday, an e-commerce website could establish a Christmas special event page from December 22 through December 25 every year and set the time range corresponding to the Christmas special event page from December 22 to December 25. In yet another example, the website could establish a Chinese New Year special event page every year for Chinese New Year, where a similar method could be used to set the time range.

The special event pages established and the time ranges set are not limited to holidays, but can target other times, such as, for example, specialized travel pages for spring or fall, or a special promotional event page for a designated type of product (such as electrical appliances) can be established on a designated date.

After the server determines (through the above operation 110) the search query input by the user and the input time point, the server can determine whether the input time point falls within the preset time range within the current period. Furthermore, continuing with the above "Christmas tree" example, suppose that the input time point when the user input the above search query "Christmas tree" is Dec. 23, 2012. The current time period is Jan. 1, 2012 through Dec. 31, 2012. In this example, two time ranges are preset within the current time period. One time range is December 22 through December 25, which is set for Christmas, and another time range is February 3 through February 10, which is set for Chinese New Year. Thus, the server determines whether the input time point when the user input the search query "Christmas tree" falls within a preset time range within the current period (Jan. 1, 2012 through Dec. 31, 2012).

In 130, the server determines whether the search query is present in a word bank based on keywords in the word bank preset for the preset time range and the search query. In the event that the search query is present in the word bank, control passes to operation 140. In the event that the search query is not present in the word bank, control passes to operation 150.

In some embodiments, for each time range corresponding to a special event page, a word bank is preset within the server for that time range. The word bank includes a plurality of keywords associated with the special event page. The server can determine whether the search query is present in the word bank based on the keywords included in the word bank corresponding to the time range preset within the current time period in which the input time point falls and the search query is input by the user.

Continuing further with the above "Christmas tree" example, since the time range preset for the specialized Christmas page within the current time period (Jan. 1, 2012 through Dec. 31, 2012) is December 22 through 25, and the input time point when the user input the search query "Christmas tree" is Dec. 23, 2012, the server, through the above operation 120, determines that the input time falls within the time range preset for the specialized Christmas page within the current time period. In operation 130, the server can determine whether the search query is present in the word bank by looking up the search query ("Christmas tree") input by the user in the keywords included in the word bank preset for the preset time range (December 22 through 25).

In 140, the server provides to the user a special event recommended term preset for the time range, and jumps to a special event page preset for the time range when the user clicks or activates the special event recommended term. For example, in a search box or in recommended words under the search box, the recommended words correspond to links and a special event recommended term has different markings than the recommended words, such as a different background. When the user clicks the special event recommended term, the user is redirected to a special event page. Also, in this case, jumping to a special event page means to be redirected to the special event page. In other words, the server sends, to the client, an active page.

In some embodiments, for each time range corresponding to a special event page, the server presets a special event recommended term corresponding to the each time range. In the event that the server, through the above operation 130, determines that the search query input by the user is present in the word bank, the server provides to the user the special event recommended term preset for the time range. Moreover, upon detecting that the user has clicked or activated the provided special event recommended term, the server jumps to the special event page preset for the time range. In other words, the server provides to the user the special event page preset for the time range, and jumps from the homepage to the special event page.

Continuing further with the above "Christmas tree" example, for the time range December 22 through 25 corresponding to the special event Christmas page, the special event recommended term corresponding to the time range is set to "Special Christmas Event." In the event that the server, through the above operation 130, determines that the search query "Christmas tree" input by the user is present in the word bank preset for the time range (December 22 through 25), the server provides to the user the special event recommended term "Special Christmas Event." In the event that the server detects that the user has clicked or activated the special event recommended term "Special Christmas Event," the server gets an HTTP request with the parameter of "Christmas Special Event" and jumps to the preset Christmas special event page. In other words, the user clicks on a "Christmas Special Event" link or search prompt link, and is redirected to the preset Christmas special event page.

In 150, the server provides to the user a recommended term other than the special event recommended term.

In the event that the server, through the above operation 120, determines that the input time point, when the user inputs the search query, does not fall within any time range preset within the current time period, or in the event that, through the above operation 130, the server determines that the search query input by the user is not present in the word bank preset for the time range in which the input time point falls, the server provides the user with a recommended term other than the special event recommended term. In other words, for example, the server employs a traditional method for providing recommended terms, only providing the user with recommended terms associated with search queries that the user has inputted.

Figure 6:
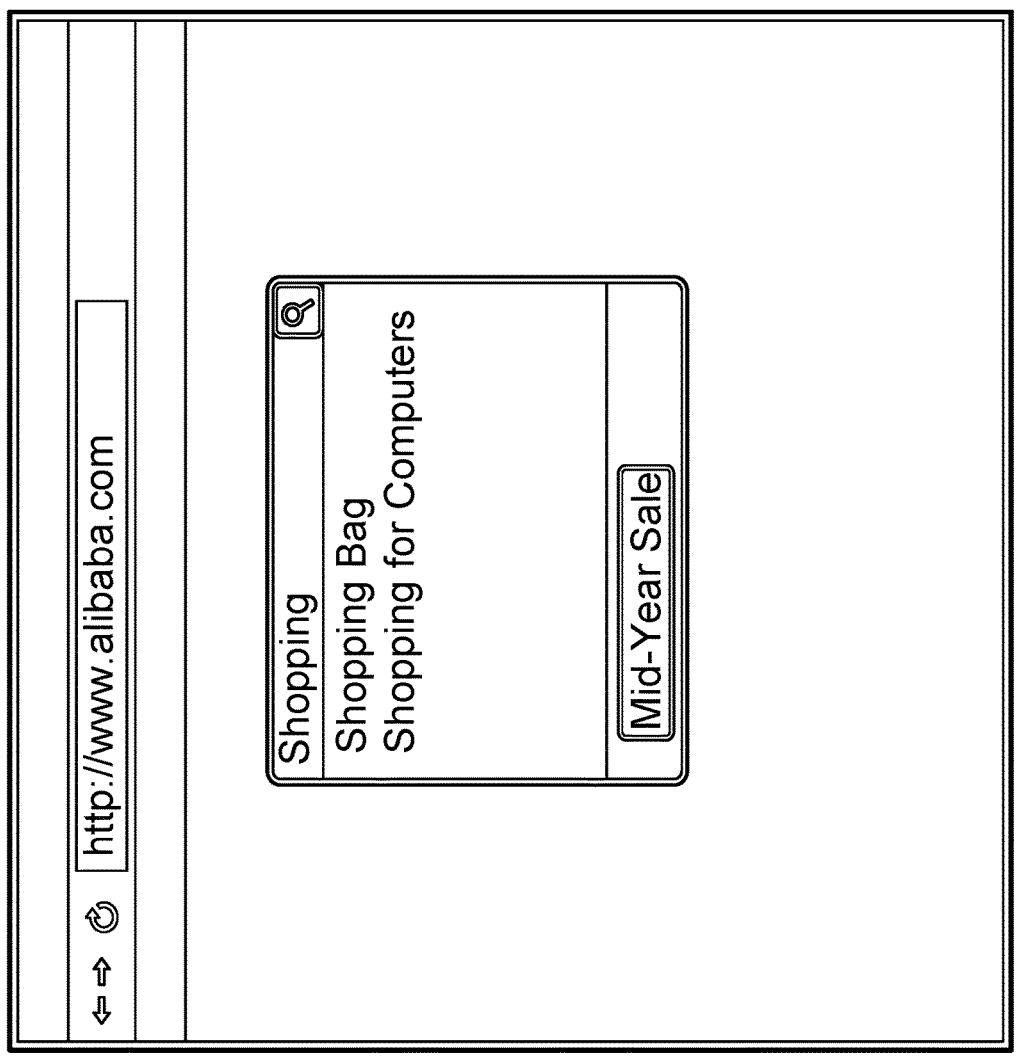
FIG. 6 is an example of a web page providing a link to a special event page.
Figure 7:
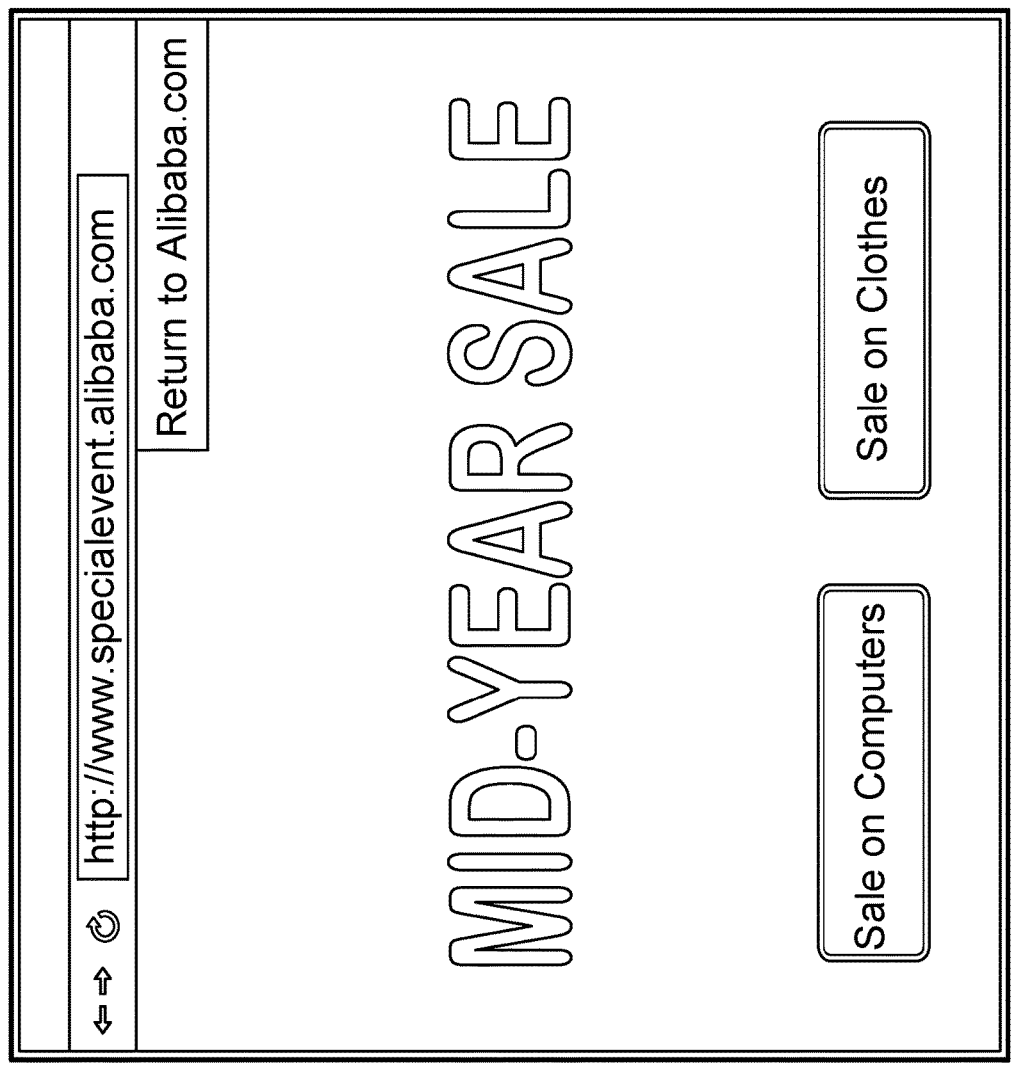
FIG. 7 is an example of a special event page.

With the above process 100, a first entrance, e.g., a search box, whereby users jump from a website homepage to another web page can be used to provide users with special event recommended terms for special event pages. FIG. 6 is an example of a web page providing a link to a special event page. In a search box of the web page, after a user enters a search term such as "shopping," other recommended search terms appear such as "shopping for computers," and at the bottom of the search box, if the search is performed within the time frame, a link to a special event page, such as a mid-year sale, appears. As soon as a user activates or clicks a special event recommended term, the server can jump to the corresponding special event page. FIG. 7 is an example of a special event page. In the special event page, for example, links to items, such as computers and clothes, are provided. Thus, the special event recommended term provided to the user can be used to guide the user to the special event page without having to add a link on the homepage to guide the user. In other words, the manual adjustment of the structure of the homepage is not needed. Therefore, users can be guided to special event pages, which will reduce website maintenance costs and conserve usage of human resources. In addition, when the search query input by the user is present in a preset word bank, the server can directly provide the user with an appropriate special event recommended term. After the user activates this special event recommended term, the server jumps directly to the corresponding special event page. Therefore, this approach also effectively reduces the number of searches and jumps performed when the users are looking up special event pages or the information displayed in the special event pages. Thus, this approach can reduce server usage and reduce the likelihood of a server crash.

Figure 2:
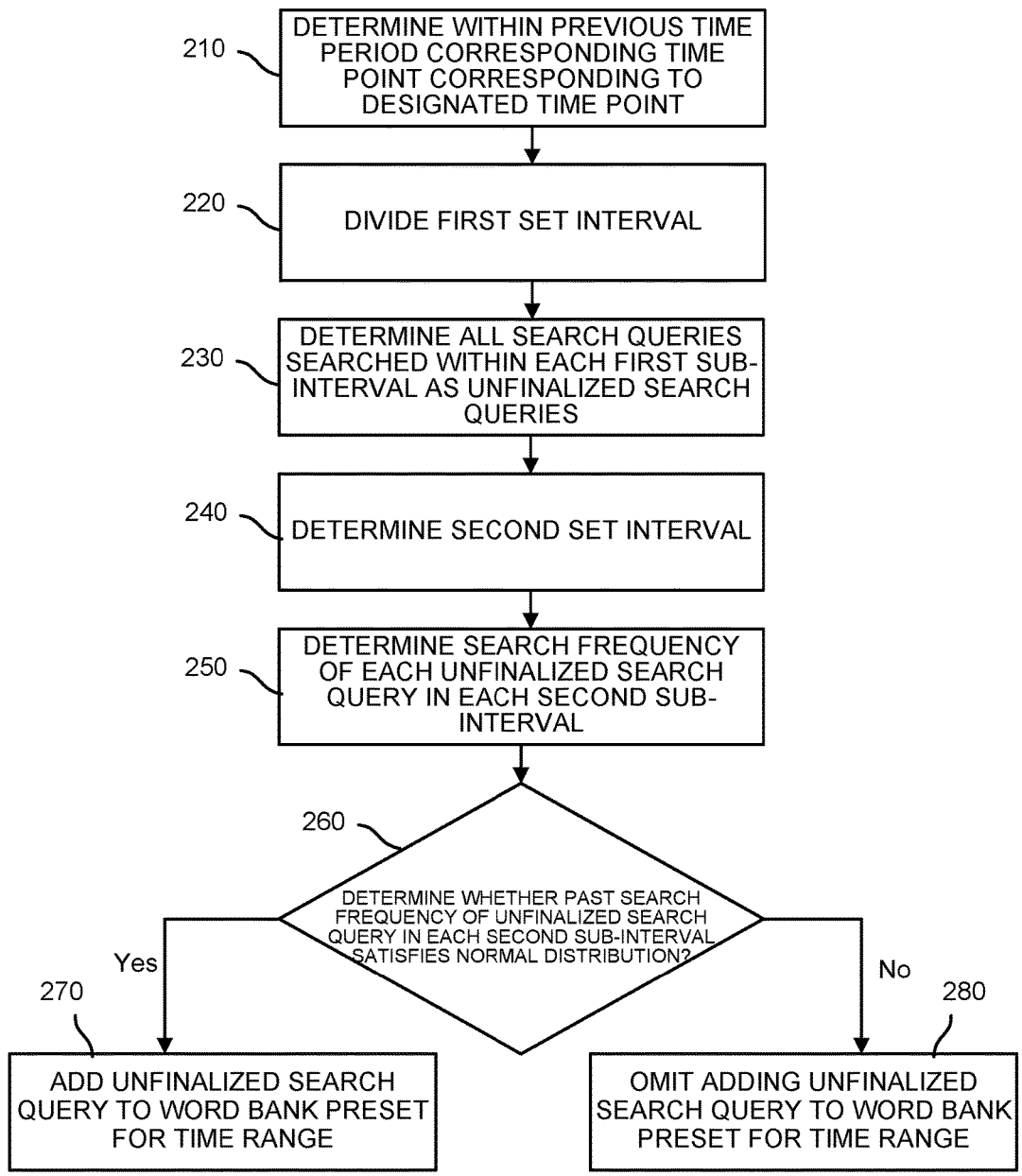
FIG. 2 is a flow diagram illustrating an embodiment of a process for presetting a word bank.

FIG. 2 is a flow diagram illustrating an embodiment of a process for presetting a word bank. In some embodiments, the process 200 is performed by a server 420 of FIG. 4 and comprises:

In 210, the server, in advance, determines within a previous time period a corresponding time point corresponding to a designated time point. The determination is made based on the designated time point within a specific time range (e.g., a present time range).

In some embodiments, any time point within the time range can be set as the designated time point.

Continuing with the above "Christmas tree" example, the time range preset for the Christmas special event page is December 22 through 25. Thus, December 25 could be set as the designated time point. Because the time period is set to one year and the current time period is Jan. 1, 2012 through Dec. 31, 2012, the previous time period is from Jan. 1, 2011 through Dec. 31, 2011. Thus, the corresponding time point corresponding to the designated time point within the previous time period is Dec. 25, 2011.

In 220, the server divides a first set interval prior to the corresponding time point within a previous time period into a plurality of first sub-intervals.

Continuing with the above "Christmas tree" example, suppose that the first set interval is 4 days including the corresponding time point (Dec. 25, 2011). Thus, the first set interval is Dec. 22 through 25, 2011. Assuming that the first set interval is divided into units of single days, in other words, the first set interval can be divided into four first sub-intervals, which are, individually: Dec. 22, 2011, Dec. 23, 2011, Dec. 24, 2011, and Dec. 25, 2011.

In 230, for each first sub-interval, the server determines all the search queries searched within the each first sub-interval as unfinalized search queries, and selects a first set quantity of unfinalized search queries from all the unfinalized search queries in the each first sub-interval. The unfinalized search queries are sorted in order of greater to lesser search frequency.

In some embodiments, the server determines all the search queries that are searched within an interval and the search frequency for each search query based on a saved search log.

Continuing with the above "Christmas tree" example, suppose that the first set quantity is 500. In this example, for the first sub-interval Dec. 22, 2011, the server determines all the search queries searched on the day Dec. 22, 2011 based on the saved search log and regards all the search queries searched on the day Dec. 22, 2011 as unfinalized search queries. Also, the server selects the first 500 unfinalized search queries ranked in order of greater to lesser search frequency for the day Dec. 22, 2011.

Similarly, the server selects 500 unfinalized search queries for each of the first sub-intervals Dec. 23, 2011, Dec. 24, 2011, and Dec. 25, 2011.

In 240, the server determines a second set interval, and divides the second set interval equally into a plurality of second sub-intervals. In some embodiments, the corresponding time point is an average time point. The average time point is defined as the midpoint of the second set interval.

In some embodiments, a time length of the second set interval and time lengths of the divided second sub-intervals both are set according to need.

Continuing with the above "Christmas tree" example, since the corresponding time point is Dec. 25, 2011, assume that the time length of the second set interval is set at 61 days. In this example, the second set interval includes the 30 days prior to the corresponding time point, the corresponding time point, and the 30 days following the corresponding time point. The mean time point of the second set interval is determined to be the corresponding time point.

Assume that the time length of the second sub-interval is set to one day. In this example, each day within the 61-day interval (i.e., the interval comprising the 30 days prior to the corresponding time point, the corresponding time point, and the 30 days following the corresponding time point) is defined as a second sub-interval.

In 250, for each selected unfinalized search query, the server determines a search frequency of the each unfinalized search query in each second sub-interval.

In some embodiments, the server first performs a redundancy elimination operation on each above selected unfinalized search query. Then, for each unfinalized search query, the server determines the search frequency of the each unfinalized search query in each second sub-interval.

Continuing with the above "Christmas tree" example, the server, in accordance with the above operation 230, separately selects 500 unfinalized search queries for each of the first sub-intervals Dec. 22, 2011, Dec. 23, 2011, Dec. 24, 2011, and Dec. 25, 2011, resulting in a total of 2,000 unfinalized search queries. In some embodiments, the server first performs a redundancy elimination technique on these 2,000 unfinalized search queries to eliminate redundancies. A redundancy elimination technique includes grouping a plurality of search words having the same meaning into a single word. For example, 圣诞树 are simplified characters for Christmas tree, and 和型诞樹 are traditional characters for Christmas tree, so they are grouped as a single word 圣诞树. Also, since the search words are gathered over four days, and there are 2000 search queries, over the four days, the 2000 search queries could be the same word, so only one word is kept.

Assume that, following the elimination of the redundancies, a remaining unfinalized search query is A (e.g., "Christmas tree"). In this example, the server determines a search frequency of this unfinalized search query A in each of the second sub-intervals as defined through operation 250. In other words, the server determines the search frequency of the unfinalized search query A for each day in the second set interval comprising the thirty days prior to the corresponding time point (Dec. 25, 2011), the corresponding time point, and the thirty days following the corresponding time point.

In 260, the server determines whether past search frequencies of the unfinalized search query in the second sub-intervals satisfy a normal distribution. In the event that the past search frequencies of the unfinalized search query in the second sub-intervals satisfy the normal distribution, control passes to operation 270. In the event that the past search frequencies of the unfinalized search query in the second sub-intervals do not satisfy the normal distribution, control passes to operation 280. For example, a finalized search query added to the word bank is "Christmas present," the search frequency is in the 30 days leading to December 25, and on those days, the frequency increases over time. The frequencies are 500, 600, 700, . . . , 4000 with a high rate of increase. In another example, an unfinalized search term is "mobile phone," which has search frequencies in the 30 day period of 10000, 10000, . . . , which do not change much.

In some embodiments, when the server determines whether the past search frequencies of the unfinalized search query in the second sub-intervals satisfy the normal distribution, the server employs an appropriate determination method based on a quantity of divided second sub-intervals.

When the quantity of divided second sub-intervals is not greater than a second set quantity of the past search frequencies, the server can employ a W-test to determine whether the past search frequencies of the unfinalized search query in the second sub-intervals satisfy a normal distribution. For example, when the determination is made using the W-test, the formula $$W = \frac{\left(\sum_{i=1}^{n} a_i x_i\right)^2}{\sum_{i=1}^{n} (x_i - \bar{x})^2}$$

can be used to determine the value of W. In this example, n represents the quantity of divided second sub-intervals; i represents the $i^{th}$ second sub-interval after each second sub-interval has been put in chronological order; $x_i$ represents a past search frequency of the unfinalized search query within the $i^{th}$ second sub-interval; $\bar{x}$ represents the mean value of past search frequencies of the unfinalized search query in all second sub-intervals;

$$(a_1, \ldots, a_i, \ldots, a_n) = \frac{m^t V^{-1}}{(m^t V^{-1} V^{-1} m)^{1/2}},$$

$m_1 \ldots m_n$, are the expected values of the order statistics for a same independent random variance sampled from a standard normal distribution; V corresponds to a covariance matrix of these order statistics; $m_1 \ldots m_n$ and V both can be looked up in a standard statistical table. Subsequently, a determination is made on whether the value of W is greater than 0.05. In the event that the value of W is greater than 0.05, the server determines that past search frequencies of the unfinalized search query within the second sub-intervals satisfy a normal distribution. In the event that the value of W is not greater than 0.05, the server determines that the past search frequencies of the unfinalized search query within the second sub-intervals do not satisfy a normal distribution When the quantity of divided second sub-intervals is greater than a second set quantity of the past search frequencies, the server employs a D-test to determine whether the past search frequencies of the unfinalized search query in the second sub-intervals satisfy a normal distribution. For example, the server first defines an empirical distribution function $$F_n(x_j) = \frac{1}{n} \sum_{i=1}^{n} I_{x_i \le x_j}.$$

In the example, n represents the quantity of divided second sub-intervals, and i represents the $i^{th}$ second sub-interval after each second sub-interval has been put in chronological order; $x_i$ represents a past search frequency of the unfinalized search query within the $i^{th}$ second sub-interval; j represents the $j^{th}$ second sub-interval after each second sub-interval has been put in chronological order; $x_j$ represents a past search frequency of the unfinalized search query within the $j^{th}$ second sub-interval; when $x_i$ is less than or equal to $x_j$, $I_{x_i \le x_j} = 1$; when $x_i$ is greater than $x_j$, $I_{x_i \le x_j} = 0$. Subsequently, the server determines the value of D based on the formula $$D = \sup_{x_j} |F_n(x_j) - F(x_j)|; F(x_j)$$

is the statistic of $x_j$ in a standard normal distribution. Lastly, the server determines whether the value of D is less than 0.05. In the event that the value of D is less than 0.05, the server determines that past search frequencies of the unfinalized search query within the second sub-intervals satisfy a normal distribution. In the event that the value of D is not less than 0.05, the server determines that past search frequencies of the unfinalized search query within the second sub-intervals do not satisfy a normal distribution.

Because both the above W-test and D-test are testing methods understood by one of ordinary skill in the art, the W-test and D-test will not be further discussed for conciseness.

In 270, in the event that the past search frequencies of the unfinalized search query in the second sub-intervals satisfy the normal distribution, the server adds the unfinalized search query to the word bank preset for the time range.

In the event that the determination is made that the past search frequencies of the unfinalized search query in the second sub-intervals satisfy a normal distribution, this determination means that the unfinalized search query is a keyword associated with the special event page corresponding to the time range. Therefore, the unfinalized search query is added to the word bank preset for the time range.

For example, when adding the unfinalized search query to the word bank preset for the time range, the server first extracts a head from the unfinalized search query and adds the extracted head to the word bank preset for the time range. The head refers to a central word or a root word. For example, a "red skirt" has a head or a central word of "skirt." Any known root word extraction technique can be used to extract the head. Accordingly, in some embodiments, in operation 130 of FIG. 1, the determination of whether the search query input by the user is present in the word bank comprises: extracting the head from the search query input by the user; determining whether the head extracted from the search query input by the user is present in the word bank; in the event that the head extracted from the search query input by the user is present in the word bank, determining that the search query input by the user is present in the word bank; in the event that the head extracted from the search query input by the user is not present in the word bank, determining that the search query input by the user is not present in the word bank.

As an example, to ensure that the unfinalized search queries added to the word bank are unfinalized search queries associated with the special event page and to increase accuracy of subsequently provided recommended terms, when the server determines that the past search frequency of the unfinalized search query in the second sub-intervals satisfy a normal distribution, and before the server adds the unfinalized search query to the word bank preset for the time range, the server also determines whether the mean value of the click rate for all information located with the unfinalized search query in the second sub-intervals is not less than a set click rate. In other words, after the server determines that the past search frequencies of the unfinalized search query in the second sub-intervals satisfy a normal distribution, the server is also to determine whether the mean value of the click rate for all information located with the unfinalized search query in the second sub-intervals is not less than a set click rate. In the event that the mean value of the click rate for all information located with the unfinalized search query in the second sub-intervals is not less than the set click rate, the server adds the unfinalized search query to the word bank preset for the time range. In the event that the mean value of the click rate for all information located with the unfinalized search query in the second sub-intervals is less than the set click rate, the server does not add the unfinalized search query to the word bank preset for the time range. In some embodiments, the aforesaid set click rate is set according to need. For example, the aforesaid set click rate is set to 0.01.

In 280, in the event that the past search frequencies of the unfinalized search query in the second sub-intervals do not satisfy the normal distribution, the server omits adding the unfinalized search query to the word bank preset for the time range.

In the event that the determination is made that the past search frequencies of the unfinalized search query in the second sub-intervals do not satisfy a normal distribution, the determination means that the unfinalized search query is not associated with the special event page corresponding to the time range. Therefore, the server does not add the unfinalized search query to the word bank preset for the time range.

In some embodiments, the aforesaid process 200 for presetting the word bank is based on the following requirement: If a search query is associated with a special event page corresponding to a preset time range, past search frequencies of the search query in the intervals preceding and following the corresponding time point (e.g., Dec. 25, 2011 in the above example) within a previous time period need to satisfy a normal distribution.

The process 200 for presetting a word bank as shown in FIG. 2 constitutes a basis for an embodiment of a process of presetting a special event page. For example, the process 200 comprises: predetermine information obtained by searching with each unfinalized search query added to the word bank, and add the obtained information to a special event page preset for a time range.

For example, assume that the unfinalized search query "Christmas tree" is added to the word bank preset for the time range December 25. In this example, the server determines information found using the search query "Christmas tree," and adds the acquired information to the Christmas special event page. The information refers to, for example, product information found using a product search engine.

In addition, in some embodiments, a special event page is automatically put online or offline based on the time range corresponding to the special event page. For example, after an appropriate special event page is established for the preset time range, the special event page is handled as follows: In the event that a current time point enters the preset time range, the special event page is put online. In the event that the current time point passes beyond the preset time range, the special event page is put offline. "Put online" refers to putting a page on the server, and "put offline" refers to removing a page from the server.

Figure 3:
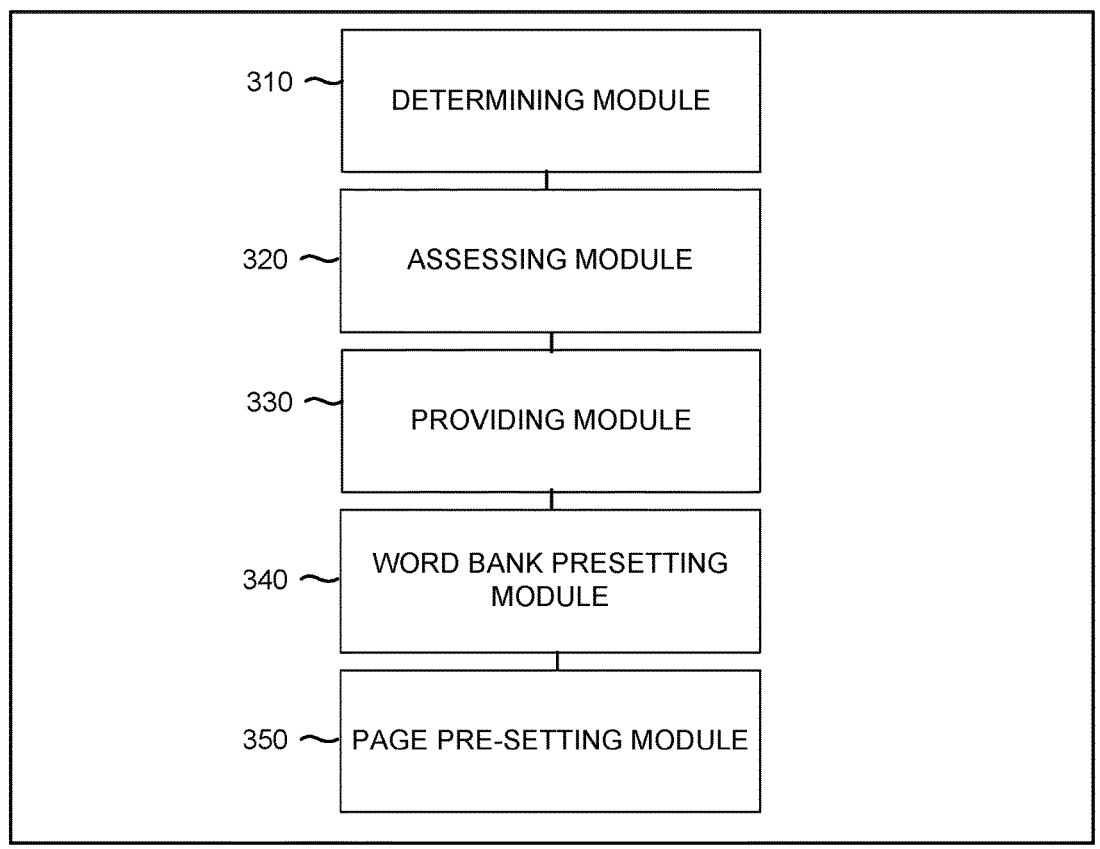
FIG. 3 is a structural diagram illustrating an embodiment of a device for providing a recommended term.

FIG. 3 is a structural diagram illustrating an embodiment of a device for providing a recommended term. In some embodiments, the device 300 implements the processes 100 of FIG. 1 and 200 of FIG. 2 and comprises: a determining module 310, an assessing module 320, and a providing module 330.

In some embodiments, the determining module 310 determines a search query input by a user and an input time point when the search query was input.

In some embodiments, when the determining module 310 determines that the input time point falls within a time range preset within the current time period, the assessing module 320 determines whether the search query is present in a word bank based on keywords in a word bank preset for the time range.

In some embodiments, when the determination result of the assessing module 320 is positive, the providing module 330 provides the user a special event recommended term preset for the time range, and jumps to a special event page preset for the time range when the user clicks or activates the special event recommended term.

In some embodiments, the device 300 further comprises: a word bank presetting module 340.

In some embodiments, the word bank presetting module 340, in advance, determines within a previous time period a corresponding time point corresponding to the designated time point based on a designated time point within the time range; divides the first set interval prior to the corresponding time point within the previous time period into a plurality of first sub-intervals; for each first sub-interval, determines all the search queries searched within that first sub-interval as unfinalized search queries; selects a first set quantity of unfinalized search queries from all the unfinalized search queries in that first sub-interval in order of greater to lesser search frequency; determines the second set interval where the corresponding time point is the average time point; divides the second set interval equally into a plurality of second sub-intervals; for each selected unfinalized search query, determines that search query's past search frequency within each second sub-interval; determines whether the past search frequencies of the unfinalized search query in the second sub-intervals satisfy a normal distribution; in the event that the past search frequencies of the unfinalized search query in the second sub-intervals satisfy a normal distribution, adds the unfinalized search query to the word bank preset for the time range; and in the event that the past search frequencies of the unfinalized search query in the second sub-intervals do not satisfy a normal distribution, omits adding the unfinalized search query to the word bank preset for the time range.

In some embodiments, the word bank presetting module 340 determines whether past search frequencies of the unfinalized search query in the second sub-intervals satisfy a normal distribution; in the event that the quantity of divided second sub-intervals is not greater than a second set quantity of unfinalized search queries, employs a W-test to determine whether the past search frequencies of the unfinalized search query in the second sub-intervals satisfy a normal distribution; and in the event that the quantity of divided second sub-intervals is greater than a second set quantity of unfinalized search queries, employs a D-test to determine whether the past search frequencies of the unfinalized search query in the second sub-intervals satisfy a normal distribution.

In some embodiments, when adding the unfinalized search query to the word bank preset for the time range, the word bank presetting module 340 extracts a head from the unfinalized search query, and adds the extracted head to the word bank preset for the time range.

In some embodiments, prior to the adding of the unfinalized search query to the word bank preset for the time range, the word bank presetting module 340 determines that the mean value of the click rate for all information located with the unfinalized search query is not less than a set click rate.

In some embodiments, the assessing module 320 extracts the head from the search query input by a user; determines whether the head extracted from the search query input by the user is present in the word bank; in the event that the head extracted from the search query input by the user is present in the word bank, determines that the search query input by the user is present in the word bank; and in the event that the head extracted from the search query input by the user is not present in the word bank, determines that the search query input by the user is not present in the word bank.

In some embodiments, the device 300 further comprises: a page pre-setting module 350.

In some embodiments, the page pre-setting module 350 predetermines information obtained by searching with each unfinalized search query added to the word bank and adds the information to the special event page preset for the time range.

In some embodiments, when the determination result of the assessing module 320 is negative, the providing module 330 provides to the user recommended terms other than the special event recommended term.

For example, the above device 300 for providing a recommended term is located in a server.

Embodiments of the method and device for providing a recommended term are provided. The method server determines a search query input by a user and an input time point when the search query was input. In the event that the input time point falls within a preset time range, the method server determines whether the search query input by the user is present in a word bank preset for the time range. In the event that the search query input by the user is present in a word bank preset for the time range, the method server provides the user with a special event recommended term preset for the time range. Moreover, in the event that the user clicks or activates the special event recommended term, the method server jumps to the special event page preset for the time range. With the above method and device, the special event recommended term provided to the user can be used to guide the user to the special event page without having to add a link on the homepage to guide the user. In other words, manually adjusting the structure of the homepage is not needed. Therefore, users can be efficiently guided to special event pages and reduce website maintenance costs and conserve human resources. In addition, when the search query input by the user is present in a preset word bank, the server can directly provide the user with an appropriate special event recommended term. After the user activates this special event recommended term, the server jumps directly to the corresponding special event page. Therefore, this approach can also effectively reduce the number of searches and jumps required of users when the users are looking up special event pages or the information displayed on the special event pages. Thus, this approach can reduce server utilization and reduce the likelihood that the server crashes.

Figure 4:
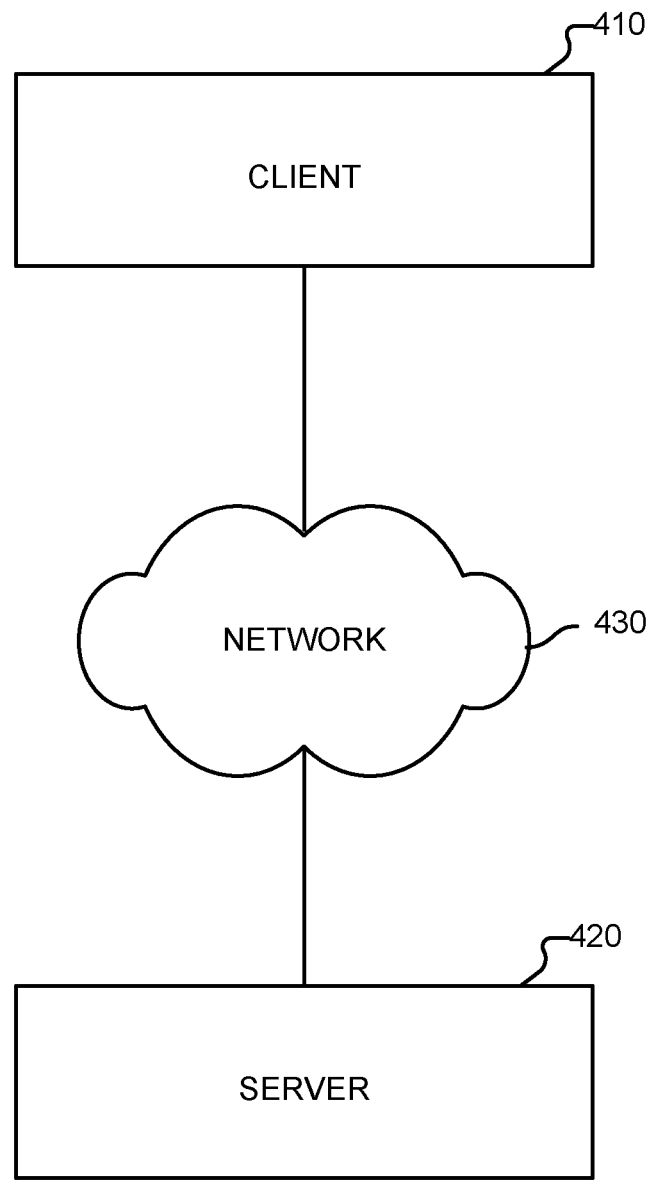
FIG. 4 is a structural diagram illustrating an embodiment of a system for providing a recommended term.

FIG. 4 is a structural diagram illustrating an embodiment of a system for providing a recommended term. In some embodiments, the system 400 includes a server 420 for providing a recommended term. The server 420 is connected to a client 410 via a network 430. In some embodiments, the client 410 inputs a search query into the server 420.

Figure 5:
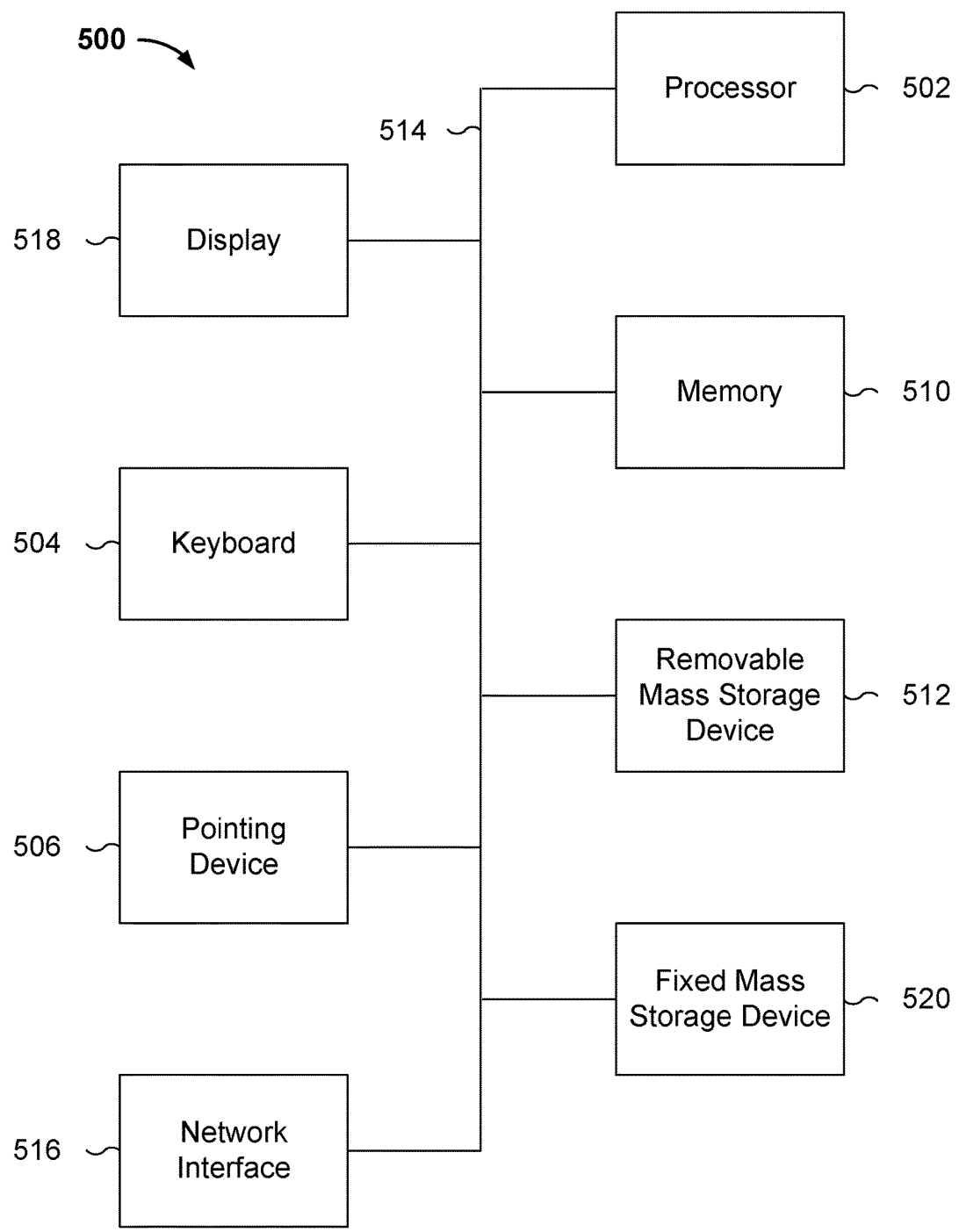
FIG. 5 is a functional diagram illustrating an embodiment of a programmed computer system for providing a recommended term.

FIG. 5 is a functional diagram illustrating an embodiment of a programmed computer system for providing a recommended term. As will be apparent, other computer system architectures and configurations can be used to provide a recommended term. Computer system 500, which includes various subsystems as described below, includes at least one microprocessor subsystem (also referred to as a processor or a central processing unit (CPU)) 502. For example, processor 502 can be implemented by a single-chip processor or by multiple processors. In some embodiments, processor 502 is a general purpose digital processor that controls the operation of the computer system 500. Using instructions retrieved from memory 510, the processor 502 controls the reception and manipulation of input data, and the output and display of data on output devices (e.g., display 518).

Processor 502 is coupled bi-directionally with memory 510, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 502. Also as is well known in the art, primary storage typically includes basic operating instructions, program code, data and objects used by the processor 502 to perform its functions (e.g., programmed instructions). For example, memory 510 can include any suitable computer-readable storage media, described below, depending on whether, for example, data access needs to be bi-directional or uni-directional. For example, processor 502 can also directly and very rapidly retrieve and store frequently needed data in a cache memory (not shown).

A removable mass storage device 512 provides additional data storage capacity for the computer system 500, and is coupled either bi-directionally (read/write) or uni-directionally (read only) to processor 502. For example, storage 512 can also include computer-readable media such as magnetic tape, flash memory, PC-CARDS, portable mass storage devices, holographic storage devices, and other storage devices. A fixed mass storage 520 can also, for example, provide additional data storage capacity. The most common example of mass storage 520 is a hard disk drive. Mass storage 512, 520 generally store additional programming instructions, data, and the like that typically are not in active use by the processor 502. It will be appreciated that the information retained within mass storage 512 and 520 can be incorporated, if needed, in standard fashion as part of memory 510 (e.g., RAM) as virtual memory.

In addition to providing processor 502 access to storage subsystems, bus 514 can also be used to provide access to other subsystems and devices. As shown, these can include a display monitor 518, a network interface 516, a keyboard 504, and a pointing device 506, as well as an auxiliary input/output device interface, a sound card, speakers, and other subsystems as needed. For example, the pointing device 506 can be a mouse, stylus, track ball, or tablet, and is useful for interacting with a graphical user interface.

The network interface 516 allows processor 502 to be coupled to another computer, computer network, or telecommunications network using a network connection as shown. For example, through the network interface 516, the processor 502 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 502 can be used to connect the computer system 500 to an external network and transfer data according to standard protocols. For example, various process embodiments disclosed herein can be executed on processor 502, or can be performed across a network such as the Internet, intranet networks, or local area networks, in conjunction with a remote processor that shares a portion of the processing. Additional mass storage devices (not shown) can also be connected to processor 502 through network interface 516.

An auxiliary I/O device interface (not shown) can be used in conjunction with computer system 500. The auxiliary I/O device interface can include general and customized interfaces that allow the processor 502 to send and, more typically, receive data from other devices such as microphones, touch-sensitive displays, transducer card readers, tape readers, voice or handwriting recognizers, biometrics readers, cameras, portable mass storage devices, and other computers.

The computer system shown in FIG. 5 is but an example of a computer system suitable for use with the various embodiments disclosed herein. Other computer systems suitable for such use can include additional or fewer subsystems. In addition, bus 514 is illustrative of any interconnection scheme serving to link the subsystems. Other computer architectures having different configurations of subsystems can also be utilized.

The modules described above can be implemented as software components executing on one or more general purpose processors, as hardware such as programmable logic devices and/or Application Specific Integrated Circuits designed to perform certain functions or a combination thereof. In some embodiments, the modules can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present invention. The modules may be implemented on a single device or distributed across multiple devices. The functions of the modules may be merged into one another or further split into multiple sub-modules.

The methods or algorithmic steps described in light of the embodiments disclosed herein can be implemented using hardware, processor-executed software modules, or combinations of both. Software modules can be installed in random-access memory (RAM), memory, read-only memory (ROM), electrically programmable ROM, electrically erasable programmable ROM, registers, hard drives, removable disks, CD-ROM, or any other forms of storage media known in the technical field.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:

receiving a search query, the search query being obtained, from a user, at an input time point, via a search box of a first web page that is being displayed at a client device, wherein the input time point corresponds to a time at which the user submitted the search query, and wherein the search query includes one or more search terms;

determining that the input time point falls within a time range corresponding to a special event period, and in response, determining whether a search term of the one or more search terms is found within a special event word bank; and in response to a determination that the search term of the one or more search terms is found within the special event word bank:

displaying a second clickable link to a second web page on the first web page, wherein the second clickable link comprises information pertaining to a special event;

causing the second clickable link to the second web page to be displayed adjacent to the search box, at the client device; and in response to a determination that the second clickable link is activated, causing the second web page to be opened.

2. The method as described in claim 1, further comprising:

determining whether a search term of the search query matches a preset search term; and in response to a determination that the search term of the search query matches the preset search term, causing another recommended search term to be displayed in the search box.

3. The method of claim 1, wherein the causing the second clickable link to be displayed comprises requires no adjustment to the first web page.

4. The method of claim 1 wherein the second web page includes information relating to a result of the search query.

5. A system, comprising:

one or more processors configured to:

receive a search query, the search query being obtained, from a user, at an input time point, via a search box of a first web page that is being displayed at a client device, wherein the input time point corresponds to a time at which the user submitted the search query, and wherein the search query includes one or more search terms;

determine that the input time point falls within a time range corresponding to a special event period, and in response, determine whether a search term of the one or more search terms is found within a special event word bank; and in response to a determination that the search term of the one or more search terms is found within the special event word bank:

display a second clickable link to a second web page on the first web page, wherein the second clickable link to a second web page comprises information pertaining to a special event;

cause the second clickable link to the second web page to be displayed adjacent to the search box, at the client device; and in response to a determination that the second clickable link is activated, cause the second web page to be opened; and one or more memories coupled with the one or more processors, wherein the one or more memories are configured to provide the one or more processors with instructions.

6. The system as described in claim 5, wherein the one or more processors are further configured to:

determine whether a search term of the search query matches a preset search term; and in response to a determination that the search term of the search query matches the preset search term, cause another recommended search term to be displayed in the search box.

7. The system of claim 5, wherein to cause the second clickable link to be displayed comprises requires no adjustment to the first web page.

8. The system of claim 5 wherein the second web page has information relating to a result of the search query.

9. A computer program product embodied in a tangible non-transitory computer readable storage medium and comprising computer instructions for:

receiving a search query, the search query being obtained, from a user, at an input time point, via a search box of a first web page that is being displayed at a client device, wherein the input time point corresponds to a time at which the user submitted the search query, and wherein the search query includes one or more search terms;

determining that the input time point falls within a time range corresponding to a special event period, and in response, determining whether a search term of the one or more search terms is found within a special event word bank; and in response to a determination that the search term of the one or more search terms is found within the special event word bank:

displaying a second clickable link to a second web page on the first web page, wherein the second clickable link comprises information pertaining to a special event;

causing the second clickable link to the second web page to be displayed adjacent to the search box, at the client device; and in response to a determination that the second clickable link is activated, causing the second web page to be opened.

10. The computer program product as described in claim 9, further comprising computer instructions for:

determining whether a search term of the search query matches a preset search term; and in response to a determination that the search term of the search query matches the preset search term, causing another recommended search term to be displayed in the search box.

11. The computer program product of claim 9, wherein the causing the second clickable link to be displayed comprises requires no adjustment to the first web page.

12. The computer program product of claim 9 wherein the second web page has information relating to a result of the search query.

13. A method, comprising:

receiving a search query, the search query being obtained via a search box of a first web page that is being displayed at a client device;

determining that the search query is present in a word bank associated with a preset time range, wherein:

the word bank is generated using at least past search frequencies of unfinalized search queries;

the past search frequencies meet one or more preset criteria; and the word bank includes a plurality of keywords corresponding to one or more special events during the preset time range;

obtaining a special event recommended term matching the search query, wherein the special event recommended term includes a clickable link to a second web page comprising information pertaining to a special event of the one or more special events;

causing the clickable link to the second web page to be displayed adjacent to the search box, at the client device; and in response to a determination that the clickable link is activated, causing the second web page to be opened, the second web page having a first information relating to a first category and a second information relating to a second category, the first category being different from the second category.

* * * * *